United States Patent [19]
Ziems

[11] Patent Number: 5,563,188
[45] Date of Patent: Oct. 8, 1996

[54] IMPACT RESISTANT COATING COMPOSITION

[75] Inventor: Wolfgang Ziems, Celle, Germany

[73] Assignee: Stankiewicz GmbH, Adelheidsdorf, Germany

[21] Appl. No.: 460,109

[22] Filed: Jun. 2, 1995

Related U.S. Application Data

[63] Continuation-in-part of Ser. No. 227,900, Apr. 15, 1994, abandoned, which is a continuation of Ser. No. 828,873, Mar. 20, 1992, abandoned.

[30] Foreign Application Priority Data

Jun. 5, 1990 [DE] Germany ............... 40 18 022.0

[51] Int. Cl.$^6$ ............... C08J 9/32; C08K 5/12; C08K 3/26; C08L 27/06
[52] U.S. Cl. ............... 523/218; 524/296; 524/427; 524/569
[58] Field of Search ............... 523/218; 524/296, 524/427, 569

[56] References Cited

U.S. PATENT DOCUMENTS

| | | | |
|---|---|---|---|
| 4,485,192 | 11/1984 | Gibbs et al. | 523/219 |
| 4,540,731 | 9/1985 | Gilvary et al. | 524/524 |
| 4,543,731 | 10/1985 | Boundy | 33/375 |
| 4,668,740 | 5/1987 | Okano | 525/227 |
| 5,212,215 | 5/1993 | Nanri et al. | 523/218 |

FOREIGN PATENT DOCUMENTS

| | | | |
|---|---|---|---|
| 0026388 | 9/1983 | European Pat. Off. | 523/219 |
| 0328046 | 8/1989 | European Pat. Off. | 523/218 |
| 62-100560 | 5/1987 | Japan | 523/219 |
| 62-260867 | 11/1987 | Japan | 523/218 |
| 1-16870 | 3/1989 | Japan | |
| 3-64347 | 3/1991 | Japan | |
| 0025419 | 2/1993 | Japan | 523/218 |
| 0117575 | 5/1993 | Japan | 523/218 |

OTHER PUBLICATIONS

M. Furuya, "Seminar in Plastic Materials 14, Vinylchloride Resin" p. 240, lines 1–8 (Oct. 15, 1961), published by Nikkan Kojgyo Shinbunsha.

W. Titow, "PVC Technology, 4th Edition" pp. 19–23 and 1137, Elsevier Science Publishing Co., Inc., New York (1984).

*Primary Examiner*—Peter A. Szekely
*Attorney, Agent, or Firm*—Scully, Scott, Murphy & Presser

[57] ABSTRACT

A polyvinyl based coating composition which protects against impact stresses. The composition includes polyvinyl chloride, vinyl chloride-vinyl acetate copolymer, calcium carbonate, hollow plastic spheres and a $C_9$ or higher phthalate acid ester plasticizer.

6 Claims, No Drawings

IMPACT RESISTANT COATING COMPOSITION

This application is a continuation-in-part of U.S. patent application Ser. No. 08/227,900 filed Apr. 15, 1994; now abandoned, which is a continuation of U.S. patent application Ser. No. 07/828,873 filed Mar. 20, 1992 now abandoned.

This invention relates to a polyvinyl chloride-based composition which provides protection against impact stresses.

Coating compositions of this kind are employed in the external parts of vehicles, for example as a corrosion-protective underseal with the ability to insulate from impact by flying stones.

To reduce the density, and hence to achieve a saving in energy, it is known to use hollow spheres of plastics in such a coating composition (EP-A1-26 388; JP-PS-1-16870/1). Such hollow plastic spheres replace part of the ordinary filler material and, in the prior art, are used in large proportions, at least in the range 0.5 to 5% by weight but also to a much greater extent.

Improved economy, however, requires not only reduced density but above all high film strength and high storage stability. The latter is an essential requirement if a coating composition is to be used for initial equipment.

The prior art is unable to provide coating compositions that meet these requirements. Above all, the employment of dioctyl phthalate in combination with PVC copolymerisates can lead to very low storage stability. This is because at temperatures between 25° and 30° C. pronounced swelling-up is to be expected, so that the usual requirement at the present day of a storage life of three months at 20° C. cannot be met (this ability to be stored, or storage life is determined using a laboratory test lasting 65 hours at 35° C.). Thus, the composition of this invention is limited to $C_9$ and higher phthalate acid ester plasticizers, of which diisononyl phthalate and diisodecyl phthalate are particularly preferred.

The relatively large addition of filler materials, particularly calcium carbonate, of over 40% leads to low film strength. Quite generally, the addition of fillers can reduce the film strength, in some circumstances considerably.

The volume of the hollow plastics spheres used to reduce density very quickly falls towards zero at temperatures above 120° C. Coating compositions are subjected, after their application to the sheet metal surface to be protected, to a temperature stress of, in general, 130° to 170° C., as a result of which the hollow plastics spheres first melt. Through the gelling process, at these temperatures the coating materials become strong enough to prevent the cavities in the hollow spheres from collapsing. Overall, the known procedure enables a reduction in density of about 30% to be obtained. The procedure is, however, very costly. Moreover, mechanical strength, particularly film strength, is reduced.

Starting from a coating composition according to the prior art, it is therefore an object of the invention to provide a coating composition with both high film strength and good storage stability despite its reduced density.

The object of the present invention is achieved by providing a composition which comprises 20 to 30% by weight polyvinyl chloride; 10 to 20% by weight vinyl chloride-vinyl acetate copolymer; 15 to 20% by weight calcium carbonate; 0.3 to 0.4% by weight hollow plastic spheres; and 30 to 40% phthalate acid ester plasticizer having at least 9 carbon atoms, said percentages based on the total weight of the composition.

The coating composition, in view of the attainment of the above object, is particularly appropriate for use as an underseal coating of the underbody of motor vehicles to insure protection against corrosion induced by stones impacting the underbody of the vehicle during travel.

The coating composition of the invention is also of interest economically, since the high film strength enables fillers to be used to reduce cost. The constituency of the composition is such that the resulting resistance to damage by flying stones, as determined by the procedure usually used in the industry, is very good, namely at least 8 hours. In such tests chippings having a size of 5 to 8 mm are used in an amount of 300 g.

The great increase in film strength while maintaining good storage stability is believed to be due to the fact that polyvinyl copolymerisates, that is, vinyl chloride-vinyl acetate copolymers, are used, in particular those having a high k value and at the same time a high vinyl acetate content. The inclusion of only 0.3 to 0.4% by wt. hollow plastic spheres provides, moreover, adequate reduction in density and improves the abrasiveness, since the hollow plastics spheres have very low abrasiveness compared to hollow mineral bodies conventionally used. It is emphasized that this concentration is critical. A concentration of less than 0.3% provides inadequate density reduction. A concentration above 0.4% results in a reduction in film strength below that obtained by the coating composition of this invention.

Another important feature is that no additions of dispersing agents are needed. This leads to substantial cost savings and, moreover, the dispersing agents can have further technical disadvantages.

Among the coloring agents and additives preferably employed in the coating composition of this invention are zinc oxide, titanium dioxide, carbon black and polyaminoamide.

In addition it is possible to spray the composition according to the invention using the known "airless" process at pressures of about 200 bar, which again facilitates its use as initial equipment.

Coating compositions according to the invention which are preferred have the following constituency:

| | |
|---|---|
| polyvinyl chloride | 20–30% by wt. |
| vinyl chloride-vinyl acetate copolymer | 10–20% by wt. |
| calcium carbonate | 15–20% by wt. |
| hollow plastics spheres | 0.3–0.4% by wt. |
| $C_9$ or higher phthalic acid ester plasticizer | 30–40% by wt. |

The composition can additionally include coloring agents and additives (thixotropic agents, bonding agents, thinners, stabilizers and mixtures thereof) in concentrations such that they do not disturb the above concentration ranges of the constituents.

By suitable selection, film strengths of at least 4 Newtons per mm² ($Nmm^{-2}$) to 7 $Nmm^{-2}$ and a storage life of 3 months at 20° C. (corresponding to a laboratory test of 65 hours at 35° C.) and a density of at most 1200 kg $m^{-3}$ and preferably 1100 kg $m^{-3}$ can be obtained if a vinyl chloride-vinyl acetate copolymer having a chain length value of k=60 and a vinyl acetate content of about 14% is used. A preferred vinyl chloride-vinyl acetate copolymer, particularly preferred for use in this composition, is Vinnol [trademark] C 14/60V manufactured by Wacker Chemie. This copolymer, which has a vinyl acetate content of 14%, is a blending type resin.

The following preferred compositions, Compositions A and B, have been found to be particularly advantageous:

|  | A | B |
|---|---|---|
|  | (% by weight) | |
| polyvinyl chloride | 23.0 | 28.0 |
| vinyl chloride-vinyl acetate copolymer | 17 | 10.0 |
| calcium carbonate | 15.1 | 18 |
| hollow plastics spheres | 0.3 | 0.4 |
| $C_9$ or higher phthalate acid ester plasticizer | 33.8 | 38.0 |
| coloring agent | 0.3 | — |
| additive | 10.5 | 5.6 |

It is noted that Composition A is representative of a preferred embodiment of the ocmposition of this invention, the embodiment wherein the weight ratio of the vinyl chloride-vinyl acetate copolymer to the $C_9$ or higher phthalate acid ester plasticizer is about 1:2.

What is claimed is:

1. A polyvinyl chloride-based coating composition which protects against impact stresses comprising:

| polyvinyl chloride | 20–30% by wt. |
|---|---|
| vinyl chloride-vinyl acetate copolymer blending resin | 10–20% by wt. |
| calcium carbonate | 15–20% by wt. |
| hollow plastics spheres | 0.3–0.4% by wt. |
| $C_9$ or higher phthalic acid ester plasticizer | 30–40% by wt. | wherein said percentages are based on the total weight of the composition whereby a film strength of 4 Newtons per $mm^2$ to 7 Newtons per $mm^2$, a storage life of 3 months at 20° C. and a maximum density of 1200 $Kg/m^3$ is obtained, said composition further characterized by said vinyl chloride-vinyl acetate copolymer having a chain length of k=60 and a vinyl acetate content of 14%.

2. A composition in accordance with claim 1 wherein said weight ratio of said vinyl chloride-vinyl acetate copolymer to said phthalate acid ester plasticizer is about 1:2.

3. A composition in accordance with claim 1 wherein said composition includes additives, said additives selected from the group consisting of thixotropic agents, bonding agents, thinners, stabilizers and mixtures thereof.

4. A composition in accordance with claim 1 wherein said composition includes a coloring agent.

5. A composition in accordance with claim 1 wherein said composition comprises:

| polyvinyl chloride | 23.0% |
|---|---|
| vinyl chloride-vinyl acetate copolymer blending resin | 17.0% |
| calcium carbonate | 15.1% |
| hollow plastic spheres | 0.3% |
| $C_9$ or higher phthalate acid ester plasticizer | 33.8% |
| coloring agent | 0.3% |
| additive | 10.5% | said percentages being by weight based on the total weights of the composition.

6. A composition in accordance with claim 3 wherein said composition comprises:

| polyvinyl chloride | 28.0% |
|---|---|
| vinyl chloride-vinyl acetate copolymer blending resin | 10.0% |
| calcium carbonate | 18.0% |
| hollow plastics spheres | 0.4% |
| $C_9$ or higher phthalate acid ester plasticizer | 38.0% |
| additive | 5.6%. |

* * * * *

UNITED STATES PATENT AND TRADEMARK OFFICE
CERTIFICATE OF CORRECTION

PATENT NO. : 5,563,188
DATED : October 8, 1996
INVENTOR(S) : Wolfgang Ziems

It is certified that error appears in the above-indentified patent and that said Letters Patent is hereby corrected as shown below:

On the title page, item [63], after "abandoned," insert the following:
--which was the national stage of international application number PCT/EP/01026, filed June 3, 1991.--

Signed and Sealed this

Second Day of September, 1997

Attest:

BRUCE LEHMAN

*Attesting Officer*    Commissioner of Patents and Trademarks